(12) United States Patent
Tesar

(10) Patent No.: US 6,791,215 B2
(45) Date of Patent: Sep. 14, 2004

(54) FAULT TOLERANT LINEAR ACTUATOR

(75) Inventor: Delbert Tesar, Austin, TX (US)

(73) Assignee: Board of Regents The University of Texas System, Austin, TX (US)

(*) Notice: Subject to any disclaimer, the term of this patent is extended or adjusted under 35 U.S.C. 154(b) by 0 days.

(21) Appl. No.: 10/455,779

(22) Filed: Jun. 5, 2003

(65) Prior Publication Data

US 2004/0007923 A1 Jan. 15, 2004

Related U.S. Application Data

(60) Provisional application No. 60/386,661, filed on Jun. 5, 2002.

(51) Int. Cl.[7] .............................................. H02K 41/00
(52) U.S. Cl. ........................... 310/12; 310/13; 74/89.26
(58) Field of Search ...................... 310/12–15; 74/89.26

(56) References Cited

U.S. PATENT DOCUMENTS

| | | | | |
|---|---|---|---|---|
| 4,246,991 A | * | 1/1981 | Oldakowski | 192/223.4 |
| 4,289,996 A | * | 9/1981 | Barnes et al. | 318/38 |
| 4,603,594 A | * | 8/1986 | Grimm | 74/89.39 |
| 5,144,851 A | * | 9/1992 | Grimm et al. | 74/89.26 |
| 5,689,994 A | * | 11/1997 | Nagai et al. | 74/89.32 |
| 6,158,295 A | * | 12/2000 | Nielsen | 74/89.38 |
| 2003/0145667 A1 | * | 8/2003 | Donald et al. | 74/89.26 |

* cited by examiner

Primary Examiner—Thanh Lam
(74) Attorney, Agent, or Firm—Gardere Wynne Sewell LLP

(57) ABSTRACT

In varying embodiments, the fault tolerant linear actuator of the present invention is a new and improved linear actuator with fault tolerance and positional control that may incorporate velocity summing, force summing, or a combination of the two. In one embodiment, the invention offers a velocity summing arrangement with a differential gear between two prime movers driving a cage, which then drives a linear spindle screw transmission. Other embodiments feature two prime movers driving separate linear spindle screw transmissions, one internal and one external, in a totally concentric and compact integrated module.

20 Claims, 5 Drawing Sheets

FAULT TOLERANT LINEAR ACTUATOR

This application claims priority to U.S. Provisional Patent Application Serial No. 60/386,661, filed Jun. 5, 2002.

The U.S. Government may own certain rights in this invention pursuant to the terms of the U.S. Department of Energy grant number DE-FG04-94EW37966.

BACKGROUND OF THE INVENTION

The present invention relates generally to electromechanical actuators, and specifically to a linear actuator having improved fault tolerance and positional control.

A number of approaches have been developed to manipulate the linear position of an object or device through the use of an actuator. Linear actuators are pervasive where the movement of very large loads is required. Linear actuation has traditionally been met by the use of hydraulic and pneumatic cylinders. Electromagnetic actuators are known, however, to provide increased performance in many aspects as compared to either hydraulic or pneumatic cylinders.

One drawback to the use of electromagnetic actuators is a certain degree of increased complexity, giving rise to increased concern over the reliability of such devices. Accordingly, certain electromagnetic linear actuators have incorporated fail-safe mechanisms of one type or another. As an example, U.S. Pat. No. 4,289,996 discloses a powered linear actuator having dual closed loop servo motor systems driving a screw jack. The dual motors drive the screw jack through differential gearing and each has an armature lock which functions automatically if a motor circuit fails thereby enabling the other motor to continue driving the actuator alone. Potentiometer feedback is applied to dual error amplifiers or polarized relays that compare the feedback position signal with the input command signal and drive separate motor energization channels.

U.S. Pat. No. 5,865,272 discloses a linear actuator having an output shaft having a pair of driven wheels mounted thereon. One of the driven wheels is rotatably mounted in a fixed plane and has a drive nut for an associated thread on the output shaft. The other drive wheel is rotatably fixed to the output shaft. An input shaft is in a side-by-side relationship with the output shaft and adapted to be rotated by a suitable power source. The input shaft provides a drive wheel for each of the driven wheels, with the ratio between each drive and driven wheel set being chosen to rotate the driven wheels at different speeds in the same rotational direction and thereby produce a controlled axial movement of the output shaft in a direction depending upon the relative rotation of the driven wheels. A fail-safe arrangement is provided in the form of a clutch between the drive wheels of the input shaft, a back-drive for the output shaft, and biasing means for affecting a back-drive.

U.S. Pat. No. 5,957,798 discloses an electromechanical actuator having a linear output for moving an external load, the actuator having at least two drive motors, a synchronizer connected to the outputs of the drive motors, a differential mechanism combining the outputs of the drive motors, and a quick release mechanism connected to the differential mechanism and the actuator output. The quick release mechanism releases support of the external actuator load in response to an internal actuator jam and maintains support of the external actuator load in response to an external actuator overload.

U.S. Pat. No. 6,158,295 discloses a linear actuator including a housing, a spindle rotatable in both directions, a threaded nut driving a piston rod, and a motor capable of driving the spindle through a transmission. A disengagement unit is arranged in the transmission for interrupting the connection between the motor and the spindle in case of operational failure, such as overloading of the spindle. The disengagement unit comprises a braking device adjustable with respect to the actuator housing to cooperate with a coupling device for control of the rotational speed of the spindle when it is disengaged from the motor.

Although each of these designs provides certain advantages, none of these designs provides a fully fault-tolerant linear actuation solution totally suitable for use in applications where life or safety is at risk. Each of these designs has its drawbacks, as will be appreciated by those of skill in the art. For example, as noted above, in any application in which a mechanical device, such as an actuator, is employed to perform a function, there is the potential and the risk of failure of the mechanical device and attendant loss of functionality. In certain situations, such failure may have only minor consequences. Wherever actuators are employed in applications in which life or safety are at risk, however, the consequences are much more severe. In high-stakes applications, such as the control of an aircraft control surface, disengagement of the actuator from the applied load is simply not an acceptable approach. Similarly, locking up the actuator with a brake would generally not be an acceptable approach in such an application. Accordingly, there is an unmet need to prevent sudden or catastrophic failure in the linear actuators employed.

Although electromechanical solutions offer definite advantages over the lower-technology hydraulic and pneumatic solutions often used in traditional linear actuation applications, the rugged simplicity of the fluid cylinder has made it tough to beat from a cost and reliability standpoint. Further, it is known that single point failures frequently occur in electromagnetic linear actuators. Where a linear actuator is susceptible to loss of function from a single point failure, the actuator could completely fail to operate in the event of such a failure. As noted above, this is an unacceptable situation in many applications.

SUMMARY OF THE INVENTION

The present invention solves the problems associated with current linear actuators. For example, in various embodiments, the systems of the present invention overcome the risk of failure by incorporating features enabling them to continue to operate under a partial or total fault on one side of a dual system. Thus, the present invention provides, in certain embodiments, fault tolerant duality in a compact, concentric, fully integrated module. This compactness and integration does not exist in any existing designs.

In accordance with one aspect of the present invention, a fault tolerant linear actuator is provided that incorporate velocity summing, force summing, or a combination of the two. In one embodiment, the invention offers a velocity summing arrangement with a differential gear between two prime movers driving a cage, which then drives a linear spindle screw transmission. This embodiment is reconfigurable, but since it has only one transmission, it does not eliminate all possible single point failures. A second embodiment features two prime movers driving separate linear spindle screw transmissions (one internal and one external) in a totally concentric and compact integrated module. This system has no single point failures, which is desirable where failure would result in loss of life or high cost. A third embodiment uses two rotary actuators driving acme screws in place of the linear spindle screw transmission to make a very rugged high force system. A fourth embodiment is a force summing linear actuator based on a dual set of linear spindle screw drives summing forces through two clutches at the output attachment plate. A fifth embodiment uses an intermediate gear train between the input prime movers and the output spindle screws in order to better balance the torque/speed ratios and to enable a significantly higher motor speed than in the second embodiment. This two-stage reduction also allows for a significant reduction in the weight of the actuator.

The development of certain technologies makes it possible for the, electromechanical actuators of the present invention to surpass the performance of prior known designs in essentially every aspect of performance. As an example, the commercial availability of the roller spindle screw transmission is a significant step forward in performance. As another example, the development of modern highly-integrated circuits allows for increases in performance and reductions in cost at the same time. Using these and other technologies, the present invention not only offers high load capacity, it also offers very long life, high precision, and high velocity in a compact configuration and the potential for a high level of actuator intelligence.

Intelligence within the actuator itself makes it possible to balance operational priorities (speed, load, precision, smoothness, etc.) in real time. Intelligence within the actuator permits the system of the present invention to be highly fault tolerant. This fault tolerance depends on a full awareness of all the performance capabilities of the actuator in real time. This awareness requires access to a wide spectrum of sensors, each generating data quantifying performance criteria used to judge the actuator's operation. Depending on the application, these performance criteria may be prioritized to meet in-situ operational goals. Here, the principal goal is to maintain operation under a fault. Depending on the operational requirements, the output of a faulty prime mover in an actuator may be quantified and used as a basis to temporarily raise the performance of the one or more fully-operational prime movers in order to make up for the loss of performance from the faulty prime mover. Alternately, the faulty prime mover may be taken completely out of service by braking it and "limping home" using the remaining prime movers.

The teachings of the present invention may be employed in any application in which there is the potential for loss of life, a need to preserve a long mission in harsh environments without possibility of repair, or a potential for high cost resulting from sudden failure. This layered control should combine to give more precise operation under significant load disturbances.

Those skilled in the art will further appreciate the above-mentioned advantages and superior features of the invention, together with other important aspects thereof upon reading the detailed description that follows in conjunction with the drawings.

BRIEF DESCRIPTION OF THE DRAWINGS

For more complete understanding of the features and advantages of the present invention, reference is now made to the detailed description of the invention along with the accompanying FIGURES.

DETAILED DESCRIPTION OF THE INVENTION

Although making and using various embodiments of the present invention are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

Figure 1:
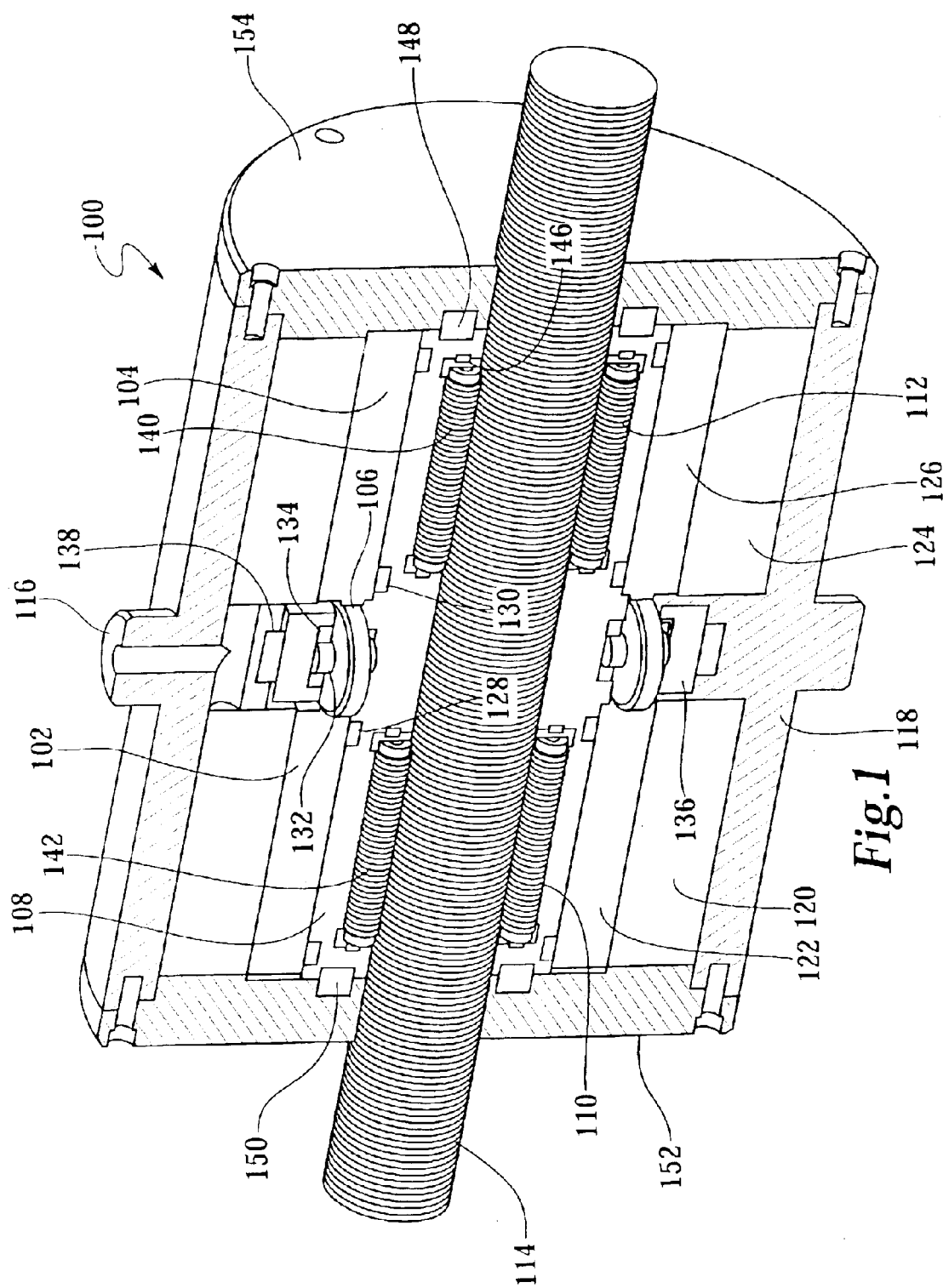
FIG. 1 depicts an isometric cutaway view of a velocity-summing fault-tolerant linear actuator according to one embodiment of the present invention.

FIG. 1 depicts an isometric cutaway view of a velocity summing fault tolerant linear actuator 100 according to one embodiment of the present invention. Actuator 100 provides a dual set of prime movers 102 and 104 operating through a differential gearset 106, which then drives a cage 108 containing two sets of spindle screw drives 110 and 112 operating on a single linear output screw 114. Fault tolerant linear actuator 100 is fault tolerant up to the differential gearset 106, e.g., either prime mover 102 or 104 may be disabled (e.g., braked) and the remaining prime mover 102 or 104 may still operate.

The trunnion 116 as part of the outer shell 118 provides one attachment to the environment with the other attachment being on the linear output screw 114. The dual prime movers 102 and 104 are arranged in a symmetrical layout. Prime mover 102 incorporates field coil cylinder 120 and armature 122. Prime mover 104 incorporates field coil cylinder 124 and armature 126. Prime movers 102 and 104 are mounted on rotary needle bearings 128 and 130, respectively, and drive multiple central differential planetary gears 132 mounted on bearings 134 in planetary cage 136 supported by planetary cage needle bearing 138.

The planetary cage 136 also contains the planetary screws 140 and 142 supported by thrust bearings 144 and 146. The planetary cage 136 as a unit is supported by principal thrust bearings 148 and 150 in the outer shell 118 of the actuator 100. The end plates 152 and 154 of the actuator 100 are fixed to the shell with machine bolts 156.

Depending on the application, actuator 100 may be designed to provide varying types of service, e.g., light, medium, or heavy-duty service. Actuator 100 is dynamically reconfigurable in real time. Should one prime mover (e.g., 102 or 104) lose torque capacity past a certain limit, the remaining prime mover (e.g., 104 or 102) may be instantaneously raised to greater than 100% of its normal torque capacity to maintain the normal level of performance for the actuator 100. Sensor systems, operational criteria, and performance histories may then be used to monitor the performance of actuator 100 relative to its reduced performance envelope.

Figure 2:
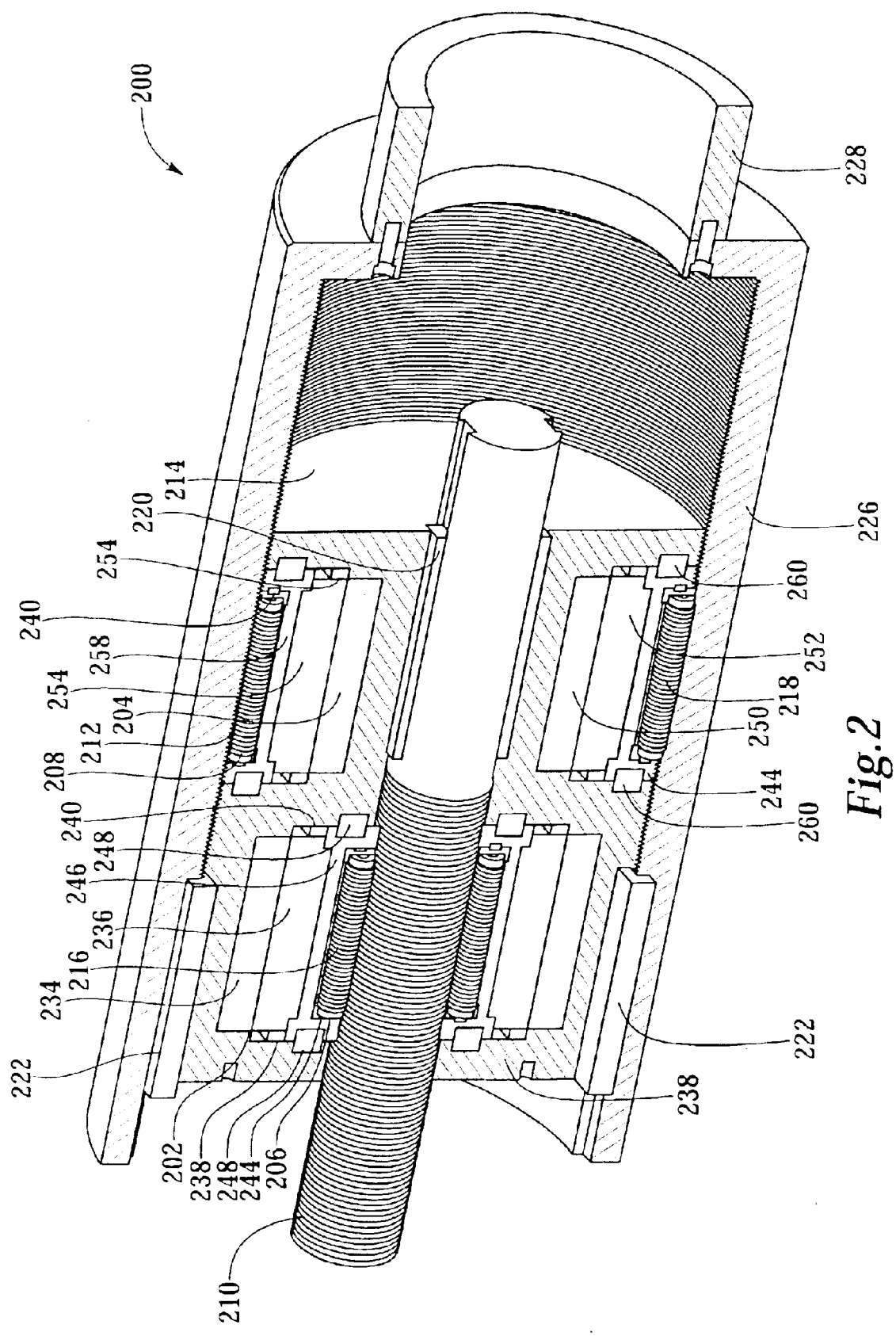
FIG. 2 depicts an isometric cutaway view of a velocity-summing fault-tolerant linear actuator according to a second embodiment of the present invention.

FIG. 2 depicts a velocity summing linear fault tolerant actuator 200 having no single point failures. Fault tolerant actuator 200 incorporates a pair of rotary prime movers 202 (1) and 204 (2), that may either be, e.g., BDCM or SRM-type, motors, driving a pair of linear spindle screw transmissions 206 and 208 acting on an external screw shaft 210 and an internal screw cylinder 212. Fault-tolerant actuator 200 incorporates an inner motion frame 214 that travels along both the external screw shaft 210 and the internal screw cylinder 212. Inner motion frame 214 also contains the two rotary prime movers 202 and 204 and their associated planetary screws 216 and 218. Inner motion frame 214 is prevented from rotation on these screws with the use of linear cross-roller bearings 220 and 222. The length and placement of these cross-roller bearings 220 and 222 will be dependent on the stroke requirements of the application.

As seen in FIG. 2, external screw shaft 210 functions as the output shaft for the fault-tolerant actuator 200 while the outer shell 226, which contains the internal screw cylinder 212, also incorporates the input attachment 228. Linear cross roller bearings 220 and 222 prevent the inner motion frame 214 from rotating relative to the external screw shaft 210 and the internal screw cylinder 212. Field 234 and armature 236 of the prime mover 202 supported by bearings 238 and 240 drive the linear planetary screws 216 in spindle bearings 244 in spindle cage 246 supported by principal thrust bearings 248. Field 250 and armature 252 of the prime mover supported by bearings 254 drive the linear planetary screws 218 in spindle bearings 240 in spindle cage 258 supported by principal thrust bearings 260.

Note that only one set of the linear cross roller bearings 220 and 222 is necessary to constrain the rotary motion of the inner frame 214. Bearing 230 is more effective in resisting the torque load on the inner frame 214 because of the larger diameter and higher torsional stiffness of the outer cylinder shell 226.

The linear fault-tolerant actuator 200 of FIG. 2 is not only fault tolerant in velocity summing between two independent prime movers 202 and 204, but also exhibits no single point failures between its two linear screw transmissions. This is a velocity summing concept with reconfiguration of the prime mover velocities in real time. The design in FIG. 2 has considerable merit for applications requiring compactness, greater simplicity, higher ruggedness, and partial fault tolerance in the electrical prime movers and their electronic control subsystems.

Figure 3:
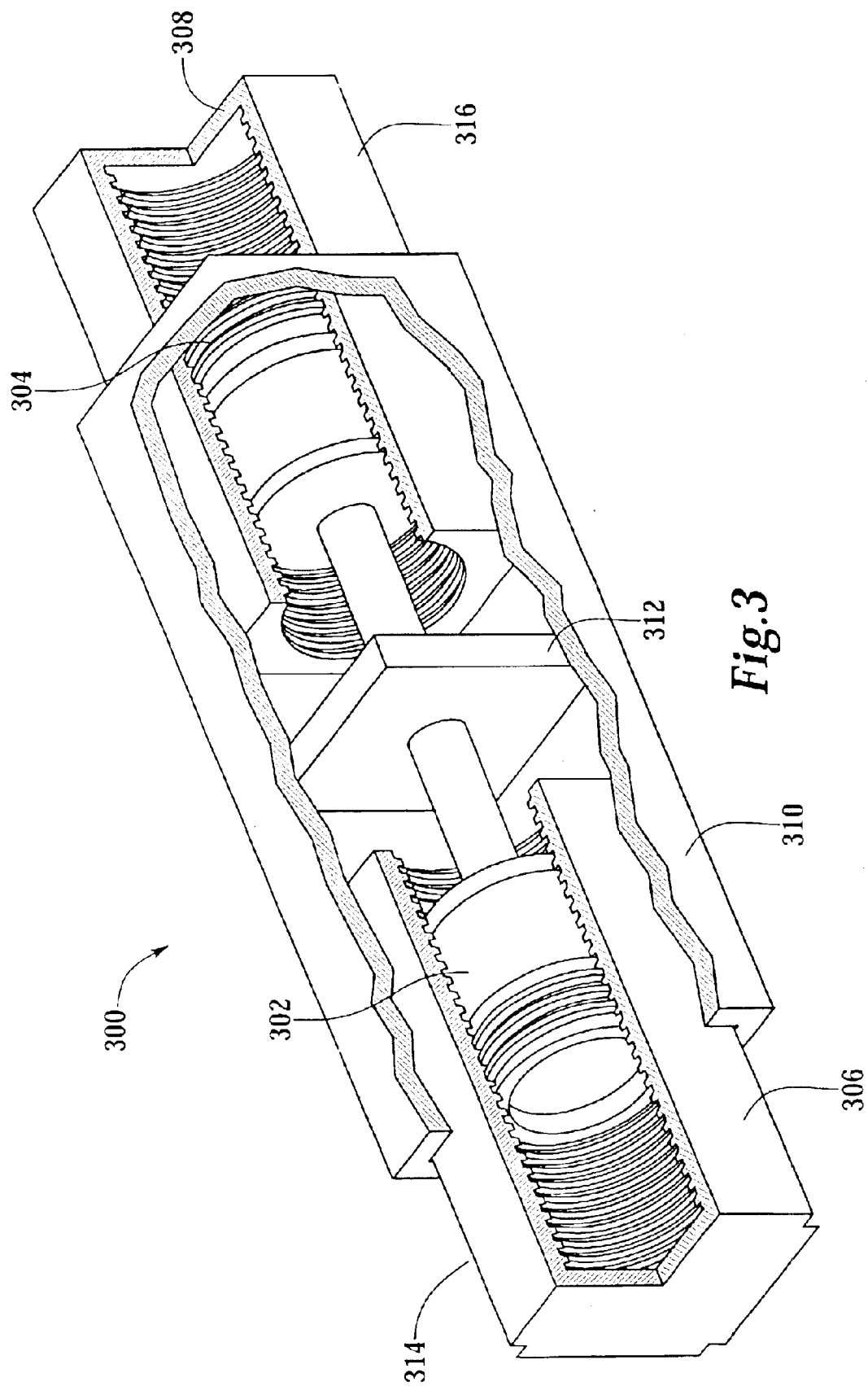
FIG. 3 depicts an isometric cutaway view of a dual fault-tolerant linear module based on a combination of rotary actuators.

Many applications require a combination of low output velocity and high output force. Also, desirable properties of small size, high stiffness, and low cost usually accompany this type of application. FIG. 3 depicts a linear actuator module 300 that uses two externally-threaded rotary actuators 302 and 304 to drive two internally-threaded cylinders 306 and 308 in series. In certain embodiments, module 300 may be designed to generate high force at relatively low cost. Although not necessarily optimized for applications requiring high linear velocities or rapid response to input commands, module 300 may be optimized to generate high force in a rigid, yet small package. In certain embodiments, three or more linear actuators (e.g., 302–304) may be combined to create an even more fault-tolerant linear actuator module 300.

In module 300 there is one external rectangular cylinder 310 attached to the actuator reference frame 312. Actuator reference frame 312 anchors each of the (externally-threaded) internal rotary actuator modules 302 and 304. In certain embodiments, the two internally-threaded rectangular cylinders 306 and 308 use linear cross roller bearings 314 and 316 for precision and stiff operation relative to the external rectangular cylinder 310. Other embodiments may employ sleeve-type bearings for the same function.

Module 300 may be employed in very low cost applications, such as in automobiles or in very low weight applications, as found in the deployment of large flaps on aircraft. In a manufacturing cell, module 300 may also be used in fixturing. Combined with high precision small motion actuators, module 300 is useful for application where both very high force and high precision are required.

The threaded interface between the externally-threaded rotary actuators 302 and 304 and the internally-threaded rectangular cylinders 306 and 308 may vary by application. For example, certain embodiments employ acme screw thread. Acme screw mechanisms are low in cost, resistant to shock and oscillatory forces, tolerant of contamination, and reliable for extended service at low velocities. Acme threads will, however, generate more friction than alternate transmissions such as the ball screw or the spindle screw.

Figure 4:
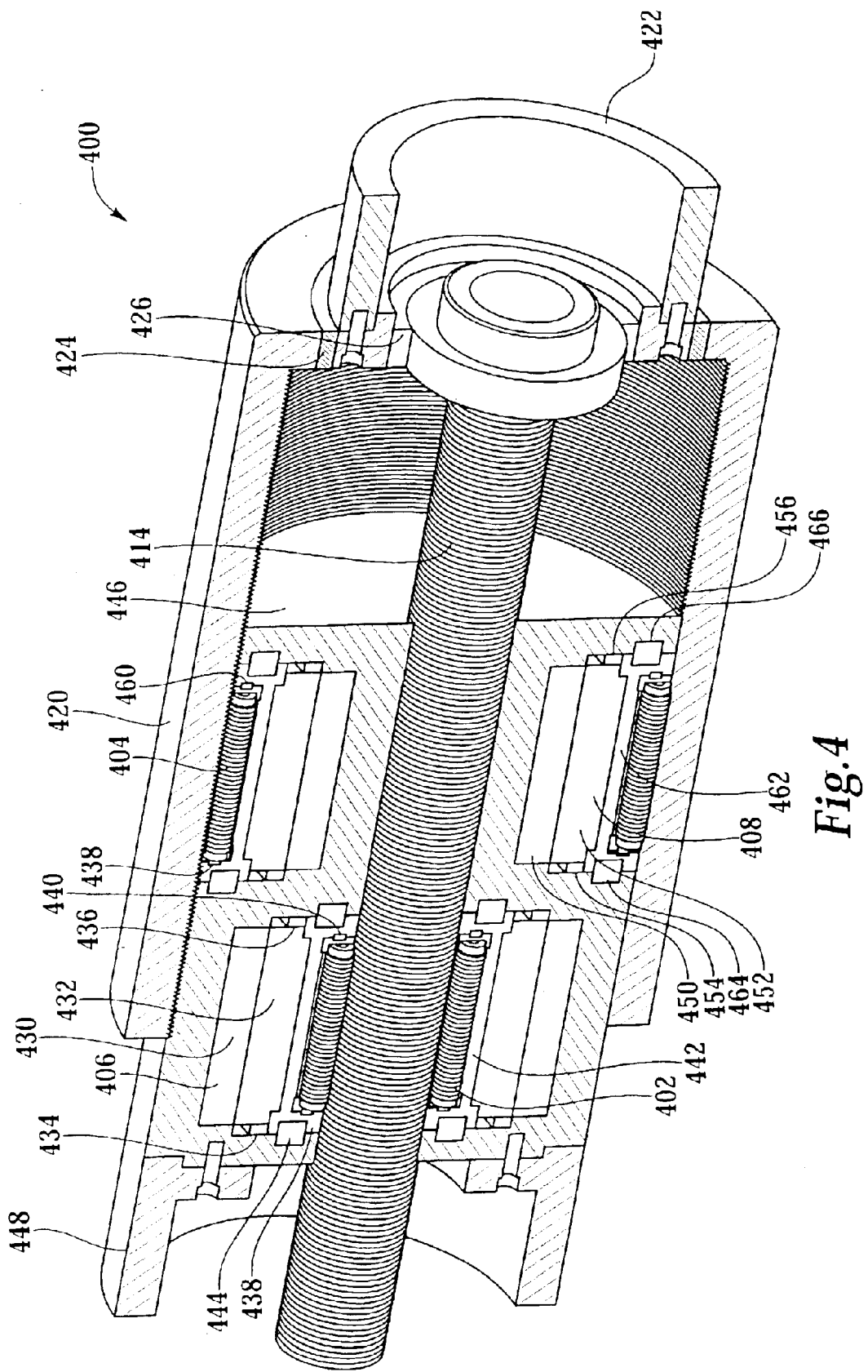
FIG. 4 depicts an isometric cutaway view of a force-summing fault-tolerant linear actuator.

FIG. 4 depicts a linear fault tolerant actuator 400 having no single point failures. This is achieved by creating dual force paths in a single envelope wherein either of the force paths (prime mover and transmission) may be removed from service by a clutch release or similar mechanism in the event of failure.

FIG. 4 depicts an isometric cutaway of a dual force path linear actuator 400. The system uses a pair of planetary roller screws 402 and 404 driven by separate prime movers 406 and 408, all in a concentric configuration. Prime mover 406 drives planetary roller screws 402, which in turn drive a roller screw shaft 414 with external threads. Prime mover 408 drives planetary screws 404 that drive a roller screw cylinder 420 with internal threads. The roller screw shaft 414 and the roller screw cylinder 420 are attached at one end to an output cylinder 422.

The roller screw cylinder 420 is separated from the output cylinder 422 by the outer clutch 424, while the roller screw shaft 414 is separated from the output cylinder 422 by the inner clutch 426. Should either of prime movers 406 or 408 fail, the associated clutch 424 or 426 may be energized to take that prime mover 406 or 408 out of service. This system ensures that operation would continue even under a major fault in one of the force pathways. In certain embodiments, a single force path may have the capacity to double its normal output for a short period of time to compensate for the failed subsystem, in order to prevent any major system failure.

Roller screw shaft 414 and outer shell, along with the roller screw cylinder 420, are connected through clutches 424 and 426 to the output cylinder 422, by means of end cap screws 428. Nut 430 connects the screw shaft 414 to the plate 432, which holds inner clutch 426.

As noted above, there are two separate prime movers 406 and 408 within linear actuator 400. Field 434 and armature 436 on support bearings 442 drive planetary screws 402 supported by spindle bearings 444. Spindle bearings 444 transfer forces through the planetary screw cage 446 to principal thrust bearing 448 to the inner motor frame 450 holding the motor fields, which is attached to the input attachment cylinder 452 through end cap screws 428.

The second prime mover 408 incorporates field 438 and armature 440 on support bearings 454 driving planetary screws 404 through support bearings 456. Support bearings 456 act through the planet cage 458 by means of thrust bearings 460. Hence, each prime mover-transmission combination independently creates a driving force on the output cylinder 422.

Constructed as shown in FIG. 4 and described above, linear actuator 400 eliminates the risk of total actuator failure brought on by any single point failure. Failures associated with threat to life, a significant economic loss, or the continuation of a long duration mission all suggest the need for continued operation even under a fault such as a lost prime mover, transmission, communication link, sensor, or power supply. Achievement of this goal requires the inclusion at least two fully independent pathways to drive the output. In the past, this meant that two separate linear actuators were arranged side-by-side and set up with separate control loops.

Although the inclusion of a separate actuation mechanism provides for a degree of fault tolerance, such a combination is complex, space-inefficient and heavy. Such a design also introduces a level of functional uncertainty that designers find unattractive. Redundancy, which sets aside one part of a dual system while the other one operates is a waste of both resources and priorities (weight, volume, cost, etc.).

In the embodiment shown in FIG. 4, all resources are employed at all times, maximizing output performance and accepting a reduced performance reserve in the event of a partial fault.

Figure 5:
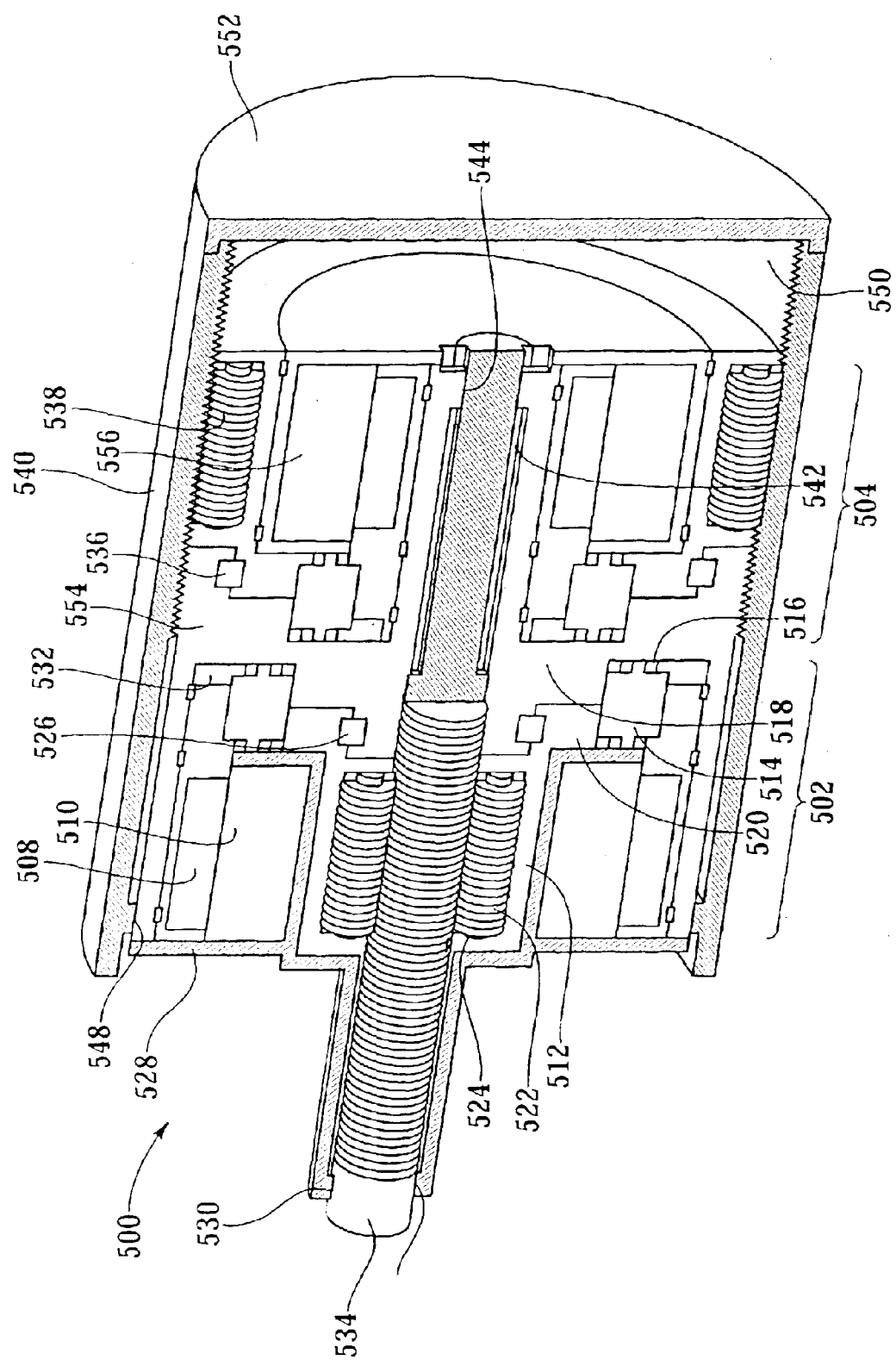
FIG. 5 depicts an isometric view of a velocity-summing fault-tolerant linear actuator with two-stage transmissions.

A fifth embodiment of the present invention is shown in FIG. 5 and generally designated 500. Actuator 500 is made up of two completely independent subsystems 502 and 504 to provide operation even under a complete failure of one of the subsystems.

The two actuator subsystems 502 and 504 of actuator 500 are geometric inverses of each other. Spindle screw set 522 drives a small diameter screw shaft 534 with external threads, while spindle screw set 538 drives a large diameter screw cylinder 540 with internal threads. Spindle screw set 538 may be at a diameter three times greater than spindle screw set 522, which would, of course, require an angular velocity reduction of three-to-one in order to maintain the same contact linear velocity at the screw threads. This reduction also reduces the stored kinetic energy in the rotating parts.

Subsystem 502 is driven by prime mover 508. Subsystem 502 is guided and supported by cage 512, which holds planet gears 514 in planet bearings 516. Planet gears 514 mesh with bull gear 518 and sun gear 520, that drive sun gear 520 attached to the spindle screw set 522 supported by spindle nut support bearings 524. The principal cross roller bearing 526 separates the sun gear 520 from the bull gear 518 and transfers the actuator load from the spindle set 522 to the actuator carriage at the bull gear 518. End caps 528, 530, 532 are used to assemble subsystem 502.

Subsystem 504 may be described in the same manner as subsystem 502, except that it is the geometric inverse of subsystem 502. In operation, axial loads pass from the actuator screw shaft 534 to spindle screw set 522 through principal cross roller bearing 526 to the actuator carriage 554 and then through principal cross roller bearing 536 on to spindle screw set 538 out to the outer shell 540 of the actuator 500. The anti-rotation splines 542 and tangs 544 prevent the carriage from rotating in the actuator 500. Seals 546 and 548 prevent the escape of the lubricant from the actuator 500. A utility coil volume 550 is provided between the actuator carriage and the end-cap 552 of the outer cylinder shell 540 for the supply of power, communications, and lubricant to the moving carriage.

In special applications, the need for low weight is critical. This may achieved, for example, by using high RPM prime movers. There becomes a mismatch between this high RPM and the low speed/high force needed at the output shaft. To make this combination feasible, an intermediate gear reduction must occur between the motors and the linear spindle screw transmissions.

In normal prime mover applications, a prime mover maximum angular velocity between at least about 3,000 and 4,000 RPM is generally considered ideal. For extremely low-weight applications, maximum prime mover angular velocities between at least about 15,000 and 30,000 RPM may be required. Such designs may output five to ten times more horsepower for the same weight of the prime mover. In order to multiply the motor torque, a first stage gear reducer, such as an epicyclic gear train, is inserted between the prime movers and the associated linear spindle screw transmission in order to balance the input and output speeds, as well as the forces involved. This first stage reduction allows for design optimization of both the prime movers and the linear spindle screw transmission.

Structurally, the strength of actuator 500 is entirely dependent on the load carrying capacity of the spindle screw sets 522 and 538 and the two principal cross roller bearings 526 and 536. Subsystem 502, which includes spindle screw set 522, crossroller bearing 520, gear transmission 514 and prime mover 508, is completely independent of subsystem 508, but they occupy a common moving carriage, which transfers the load from the actuator screw shaft to the outer cylinder screw shell.

Because the spindle screw sets 522 and 538 create a turning resistance due to friction, an anti-rotation spline 542 is built into the right side of the actuator screw shaft 534, in order to prevent rotation of the carriage 554. In one embodiment, it is likely that spindle screw sets 522 and 538 will be of the same length to carry the same load.

In another embodiment, the lead on spindle screw set 522 is at least about 0.2 in./rev. given a desired output speed of at least about 3.5 in./sec., an angular velocity of at least about 1050 RPM would be demanded of prime mover 508. The intermediate gear transmission ratio for subsystem 502 would have to be at least about 14.3 to 1. The equivalent desired speed for spindle set 538 would be at least about 300 RPM.

In yet another embodiment, the lead of the internal cylinder screw 550 is at least about 0.7 in./rev. Given a maximum angular speed of at least about 30,000 RPM for second prime mover 556, the intermediate gear transmission ratio of subsystem 504 would be at least about 100-to-1. The low speeds in the spindle screws 522 and 538 will be very helpful in extending the life of these critical parts in actuator 500.

Nonetheless, the high rotational speed requirements place considerable demands on the intermediate gear transmissions. First, the exceptionally high angular velocities will store considerable kinetic energy. For epicyclic gears, this requires that the planets be as small as possible.

In certain additional embodiments, the subsystems 502 and 504 may operate in opposite directions in order to better balance the friction turning torques on the moving carriage 554.

Owing to the use of roller screws, subsystems 502 and 504 are naturally non-backdrivable. Depending on the pitch of the screw threads and the application, there still may be a need to put in place brakes on each of the armatures to prevent the system from walking under oscillating external loads.

In certain other embodiments of actuator 500, each subsystem 502 and 504 provides one-half of the total stroke length. Accordingly, actuator 500 may always return to the neutral position and operate in only one-half its useful range, with one side completely incapacitated. Alternately, a partially failed side could "limp" home to the center of its range, and then be locked in place, so that the remaining operable side could provide fifty percent of the range capacity about the center position.

It should be mentioned that in some applications, it would be useful to provide for consistent lubrication of the actuator. For example, a low viscosity oil under pressure may be used to provide a misted atmosphere inside the actuator volume. The lubricant could be recirculated in a closed circuit and may also be cooled if the duty cycle demands that heat be removed from the system. This, then, requires at least about two seals: a first seal between a smooth surface on the carriage 554 and the outer cylinder shell 540 and a second seal between a smooth surface on the actuator screw shaft 534 and an extension of the actuator carriage 540. The other end of actuator 500 is sealed by an end cap 552 on the outer cylinder shell 540.

Additional objects, advantages and novel features of the invention as set forth in the description that follows, will be apparent to one skilled in the art after reading the foregoing detailed description or may be learned by practice of the invention. The objects and advantages of the invention may be realized and attained by means of the instruments and combinations particularly pointed out here.

What is claimed is:

1. A linear actuator comprising:
   a substantially-cylindrical actuator frame having a principal axis, an electromagnetic field therein, and an internal surface having a thread disposed thereon;
   a linear output screw having threads disposed thereon, the linear output screw disposed at least partly within the actuator frame along the principal axis;
   a first armature disposed within the actuator frame about the principal axis;
   a first planetary spindle screw set, having threads mated to the threads of the linear output screw, disposed in a first carrier radially-fixed to the first armature about the linear output screw;
   a second armature disposed within the actuator frame about the principal axis; and
   a second planetary spindle screw set, having threads mated to the internal threads of the actuator frame, disposed in a second carrier radially-fixed to the second armature.

2. The actuator of claim 1 further comprising a first field coil cylinder axially aligned with the first armature and a second field coil cylinder axially aligned with the second armature.

3. The actuator of claim 2 wherein the first and second field coil cylinders are disposed in an inner motion frame.

4. The actuator of claim 3 wherein the inner motion frame is axially-movable with respect to the actuator frame, but is radially-fixed with respect to the actuator frame.

5. The actuator of claim 1 wherein the first set of planetary spindle screws is disposed in a first carrier and the second set of planetary spindle screws is disposed in a second carrier.

6. The actuator of claim 5 further comprising an inner motion frame axially-movable with respect to the actuator frame, but radially-fixed with respect to the actuator frame.

7. The actuator of claim 6 wherein each planetary spindle screw set is axially-fixed within the inner motion frame but radially-movable, and wherein the first and second carriers are held in the inner motion frame by a set of thrust bearings.

8. The actuator of claim 1 further comprising a set of sensors for constantly monitoring the torque output of each armature.

9. The actuator of claim 1 wherein the first set of planetary spindle screws are disposed at a first axial location along the linear output screw and the second set of planetary spindle screws are disposed at a second axial location along the linear output screw.

10. The actuator of claim 1 further comprising a first brake to lock the radial position of the first armature with respect to the inner motion frame and a second brake to lock the radial position of the second armature with respect to the inner motion frame.

11. A linear actuator comprising:
    a substantially-cylindrical actuator frame having a principal axis, an electromagnetic field therein, and an internal surface having a thread disposed thereon;
    a screw shaft having threads disposed thereon, the screw shaft disposed at least partly within the actuator frame along the principal axis and radially-fixed to a clutch plate;
    an output cylinder;
    an inner clutch having a first portion radially-fixed to the clutch plate and a second portion radially-fixed to the output cylinder;
    an outer clutch having a first portion radially-fixed to the output cylinder and a second portion radially-fixed to the actuator frame;
    a first armature disposed within the actuator frame about the principal axis;
    a first spindle screw set, having threads mated to the threads of the screw shaft, disposed in a carrier rotatably fixed to the first armature about the screw shaft;
    a second armature disposed within the actuator frame about the principal axis; and
    a second spindle screw set, having threads mated to the internal threads of the actuator frame, disposed in a carrier rotatably fixed to the second armature.

12. The actuator of claim 11 further comprising a first field coil cylinder axially aligned with the first armature and a second field coil cylinder axially aligned with the second armature.

13. The actuator of claim 12 wherein the first and second field coil cylinders are disposed in an inner motion frame.

14. The actuator of claim 13 wherein the inner motion frame is axially-movable with respect to the actuator frame, but is radially-fixed with respect to the actuator frame.

15. The actuator of claim 11 wherein the first set of planetary spindle screws is disposed in a first carrier and the second set of planetary spindle screws is disposed in a second carrier.

16. The actuator of claim 15 further comprising an inner motion frame axially-movable with respect to the actuator frame, but radially-fixed with respect to the actuator frame.

17. The actuator of claim 16 wherein each planetary spindle screw set is axially-fixed within the inner motion frame but radially-movable, and wherein the first and second carriers are held in the inner motion frame by a set of thrust bearings.

18. The actuator of claim 11 further comprising a set of sensors for constantly monitoring the torque output of each armature.

19. The actuator of claim 11 wherein the first set of planetary spindle screws are disposed at a first axial location along the linear output screw and the second set of planetary spindle screws are disposed at a second axial location along the linear output screw.

20. The actuator of claim 11 further comprising a first brake to lock the radial position of the first armature with respect to the inner motion frame and a second brake to lock the radial position of the second armature with respect to the inner motion frame.

* * * * *